US012026965B2

(12) United States Patent
Afridi et al.

(10) Patent No.: US 12,026,965 B2
(45) Date of Patent: Jul. 2, 2024

(54) VIDEO BASED CONTINUOUS PRODUCT DETECTION

(71) Applicant: 3M INNOVATIVE PROPERTIES COMPANY, St. Paul, MN (US)

(72) Inventors: Muhammad J. Afridi, Woodbury, MN (US); Mojtaba Kadkhodaie Elyaderani, St. Paul, MN (US); Matthew T. Scholz, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 299 days.

(21) Appl. No.: 17/650,019

(22) PCT Filed: Aug. 5, 2020

(86) PCT No.: PCT/IB2020/057417
§ 371 (c)(1),
(2) Date: Feb. 4, 2022

(87) PCT Pub. No.: WO2021/033061
PCT Pub. Date: Feb. 25, 2021

(65) Prior Publication Data
US 2023/0360416 A1    Nov. 9, 2023

Related U.S. Application Data

(60) Provisional application No. 62/888,664, filed on Aug. 19, 2019.

(51) Int. Cl.
*G06V 20/80*    (2022.01)
(52) U.S. Cl.
CPC ........ *G06V 20/80* (2022.01); *G06V 2201/034* (2022.01)

(58) Field of Classification Search
CPC .......................... G06V 20/80; G06V 2201/034
See application file for complete search history.

(56) References Cited

U.S. PATENT DOCUMENTS

2019/0090954 A1*  3/2019  Kotian .................. H04N 23/90
2019/0384980 A1*  12/2019  Chen ..................... H04N 23/69
(Continued)

FOREIGN PATENT DOCUMENTS

WO    WO 2019-106474       6/2019
WO         2020/172076 A1    8/2020

OTHER PUBLICATIONS

Lavado, "Sorting surgical tools from a cluttered tray-object detection and occlusion reasoning image", 2018, URL< https://estudogeral. uc pt/bitstream/10316/86257/I/Tese-Diana_VersaoFinal.PDF>, 146 pages.

(Continued)

*Primary Examiner* — David Perlman
(74) *Attorney, Agent, or Firm* — Sriram Srinivasan

(57) ABSTRACT

A product authentication system includes one or more image capture devices that provide video data representative of an enhanced safety environment. The product authentication system can determine the continuous presence of a designated product during a time period, for example, during performance of a task in an enhanced safety environment. The video data can be spatiotemporally sliced according to multiple orientations with respect to the time axis and the two spatial axes. A plurality of data streams are created where the slices of each respective data stream have the same orientation. The data streams are processed according to one or more machine learning models, such as convolutional neural networks trained to determine whether the designated product is continuously present in the video data. An indicator of the continuous presence of the designated (Continued)

product can be provided to a downstream system and used to indicate whether functions of the downstream system are to be performed.

20 Claims, 8 Drawing Sheets

(56) References Cited

U.S. PATENT DOCUMENTS

2020/0253683 A1* 8/2020 Amanatullah ......... A61B 90/06
2020/0257902 A1* 8/2020 Yao .......................... G06N 3/08

OTHER PUBLICATIONS

Meinich-Bache, "Object detection during newborn resuscitation activities", IEEE Journal of biomedical and health informatics, 2019, vol. 24, No. 3, pp. 796-803.

International Search report for PCT International Application No. PCT/IB20202/057417 mailed on Oct. 26, 2020, 4 pages.

* cited by examiner

VIDEO BASED CONTINUOUS PRODUCT DETECTION

CROSS REFERENCE TO RELATED APPLICATIONS

This application is a national stage filing under 35 U.S.C. 371 of International Application No. PCT/IB2020/057417, filed 5 Aug. 2020 which claims the benefit of U.S. Provisional Application No. 62/888,664, filed 19 Aug. 2019, the disclosure of each of which is incorporated by reference in its respective entirety herein.

TECHNICAL FIELD

This disclosure relates to the field of product authentication, and more particularly to video based continuous product authentication.

BACKGROUND

Medical procedures can present numerous challenges to medical professionals. For example, depending on the procedure to be performed on a patient, there may be numerous different products and instruments that may be appropriate and each of these products and instruments may have best practices associated with them. A mistake in the selection or use of a particular product can have serious consequences for all parties involved, including the patient, the medical professionals selecting and/or using the product, and the manufacturer of the product.

SUMMARY

In general, this disclosure describes techniques performing continuous product authentication in environments where medical procedures may be performed. Conventional systems may be able to recognize an object in a two-dimensional (2D) static image. However, a technical problem with such conventional systems is that they do not provide any way to continuously determine that a product is present and authentic over a period of time. For example, a static image does not necessarily include or otherwise convey information for a period of time but, instead, provides at best a snapshot for a particular moment. Thus, it can be difficult for conventional systems to use static images to capture information as to how a product is used over time, changes in the appearance of the product after it has been used or applied, changes to the manner in which the product is used throughout the duration of the period of interest, or even whether the same product or type of product was continuously used appropriately or even at all throughout the entirety of the time period.

One example where the continuous authentication techniques described herein may be desirable is during a medical procedure. For example, two sterilization products, a "Brand A" and "Brand B" sterilization product may be available, each having different application techniques. A medical professional may decide to use the "Brand A" sterilization product. The ability to determine which product is authenticated and in continuous presence or utilization may be useful to automatically provide instructional material to the medical professional that is specific to the product. Thus, the ability to determine the continuous presence of an authenticated product can be used to prevent presentation of erroneous instructional material to the medical professional. Additionally, the continuous presence of the authenticated product can be automatically logged to provide proof that the designated product was used (or not used, as the case may be). Further, the continuous presence of the product can be used by other systems to determine if the product is being used in a correct manner. Further, information gathered from during the continuous authentication processes can be provided to other systems for their use. For example, a corresponding feature map extracted by the system's neural network layers during the continuous authentication process described herein may be provided to a downstream system.

As a technical solution to the aforementioned technical problem, some aspects of the disclosure include a product authentication training system that uses video data to train a machine learning model to recognize products that may be used in environments requiring an enhanced level of safety. An example of such an environment includes a medical environment such as an operating room of a hospital, day surgery facility, or other medical facility. For example, the machine learning system can be used to train a neural network. The machine learning model can be trained to recognize various types of products. Examples of such products include materials applied to a patient during a procedure, medical instruments, protective materials etc. The machine learning model may be trained to recognize various aspects of a product. For example, the machine learning model may be trained to recognize a container for the product. Further, the machine learning model may be trained to recognize the appearance of the product before application to a patient, the appearance of the product when initially applied to a patient, and/or changes in the appearance of the product over time.

The trained machine learning model can be deployed for use by an accompanying product authentication system in an environment having elevated safety concerns such as a hospital, day surgery facility, clinic, long term care facility, sterile processing environments, hazardous materials environment or other such environments where product safety concerns may make continuous product authentication desirable. As an example, an operating room in a hospital may have one or more video cameras installed to monitor the preparation for, and performance of, a medical procedure. Video data from the one or more cameras is provided to the product authentication system. The product authentication system can apply the trained machine learning model to the video data to determine if a designated product is present in the video data. Other aspects of the product may also be recognized from the video data. For example, dosage or quantity information, expiration dates, etc. may be recognized from labeling or coding on the product's container. Further information that may be recognized from the video data includes a time the care is delivered, a duration that care is delivered (e.g. how long a wound dressing or catheter has been in use), patient positioning (e.g. proper angle to reduce risk of acquiring ventilator associated pneumonia, positions that may contribute to pressure ulcers, hand hygiene compliance, compliance with other best practices as may be established by a medical facility or captured in official guidelines, such as use of alcohol based patient skin antiseptic, incise drapes, antibiotic administration prior to skin incision, control of metabolites such as glucose, etc.

If a designated product is recognized within the video data, the product authentication system can supply the recognized aspects (e.g., presence indicator, quantity, dosage, expiration date, etc.) to a downstream system that can use one or more of the recognized aspects to perform further functions. For example, a downstream system may be able recognize activities associated with the product as they are performed by the end users of the product. In response to knowing that an authenticated product is being used and the activities associated with the product, the downstream system can provide various types of feedback to the product end users that are specific to the authenticated product. For example, upon recognizing a product, a downstream instructional system can present information on a video monitor or other output device in the operating room. The information can include product usage information, product data, warnings, contraindications etc. that are specific to the product. Further, upon recognition of an authenticated product in the video data, a downstream system can use the recognized aspects of the authenticated product to determine whether the activities being performed by a medical professional are being correctly performed.

The aspects described above, and further aspects described below can provide technical improvements over conventional systems. For example, unlike the systems described herein, conventional systems typically cannot process video data as a three-dimensional (3D) spatio-temporal entity for authenticating products, and cannot determine whether a designated product is continuously present in a medical procedure environment based on spatio-temporal analysis of video data. The spatio-temporal analysis techniques described herein can provide additional advantages over conventional systems by capturing features that correspond to 'changes' in the appearance of a product over time. The spatio-temporal analysis techniques described herein can also be used to capture features of motion and behavior of a user interacting with product, regardless of its appearance and use such features to identify and/or authenticate a product. For example, different product designs can enforce certain motions or behaviors due to the design of the product. The techniques described herein can capture such motions and behaviors and use them to assist in authenticating a product. Also, the techniques described herein can capture past context while enabling a system to make a decision regarding product authenticity at various times.

Additionally, the aspects described above and further aspects described below can provide one or more practical applications, such as continuously authenticating a product and providing an indication of the authenticity and continuing presence of the product to downstream systems that can verify when the authenticated product is used and that the authenticated product is being used correctly. Further, the downstream system can provide real-time feedback on a medical professional's use of a product.

In one or more example aspects, a product authentication system includes at least one image capture device configured to capture video data representative of an enhanced safety environment; a machine learning model trained to recognize a designated product; and at least one computing device comprising a memory and one or more processors coupled to the memory, wherein the memory comprises instructions that cause the one or more processors to continuously perform operations comprising: determine, from the video data, a three-dimensional data window having a first spatial axis, a second spatial axis and a time axis, generate, from the three-dimensional data window, at least one data stream including data varying along the time axis of the three-dimensional data window, the at least one data stream having a plurality of slices of the three-dimensional data window, determine, based at least in part on the at least one data stream and the machine learning model, continuous presence of the designated product in the enhanced safety environment, and provide an indicator of the continuous presence of the designated product to a downstream system.

In one or more further example aspects, a method includes capturing, via at least one video capture device, video data representative of an enhanced safety environment; continuously performing, during at least a portion of one or more actions taken with respect to the enhanced safety environment, operations comprising: determining, from the video data, a three-dimensional data window having a first spatial axis, a second spatial axis and a time axis, generating, from the three-dimensional data window, at least one data stream including data varying along the time axis of the three-dimensional data window, the at least one data stream having a plurality of slices of the three-dimensional data window, determining, based at least in part on the at least one data stream and a machine learning model trained to recognize a designated product, continuous presence of the designated product in the enhanced safety environment; and providing an indicator of the continuous presence of the designated product to a downstream system.

In one or more additional example aspects, a non-transitory, computer-readable medium comprises instructions that, when executed, cause one or more processors of a product authentication system to continuously perform, during at least a portion of one or more tasks in an enhanced safety environment, operations comprising: receive video data representative of the enhanced safety environment; determine, from the video data, a three-dimensional data window having a first spatial axis, a second spatial axis and a time axis; generate, from the three-dimensional data window, at least one data stream including data varying along the time axis of the three-dimensional data window, the at least one data stream having a plurality of slices of the three-dimensional data window; determine, based at least in part on the plurality of data streams and a machine learning model, continuous presence of a designated product in an enhanced safety environment; provide an indicator of the continuous presence of the designated product to a downstream system.

The details of one or more examples of the disclosure are set forth in the accompanying drawings and the description below. Other features, objects, and advantages of the disclosure will be apparent from the description and drawings, and from the claims.

It is to be understood that the examples may be utilized, and structural changes may be made without departing from the scope of the invention. The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
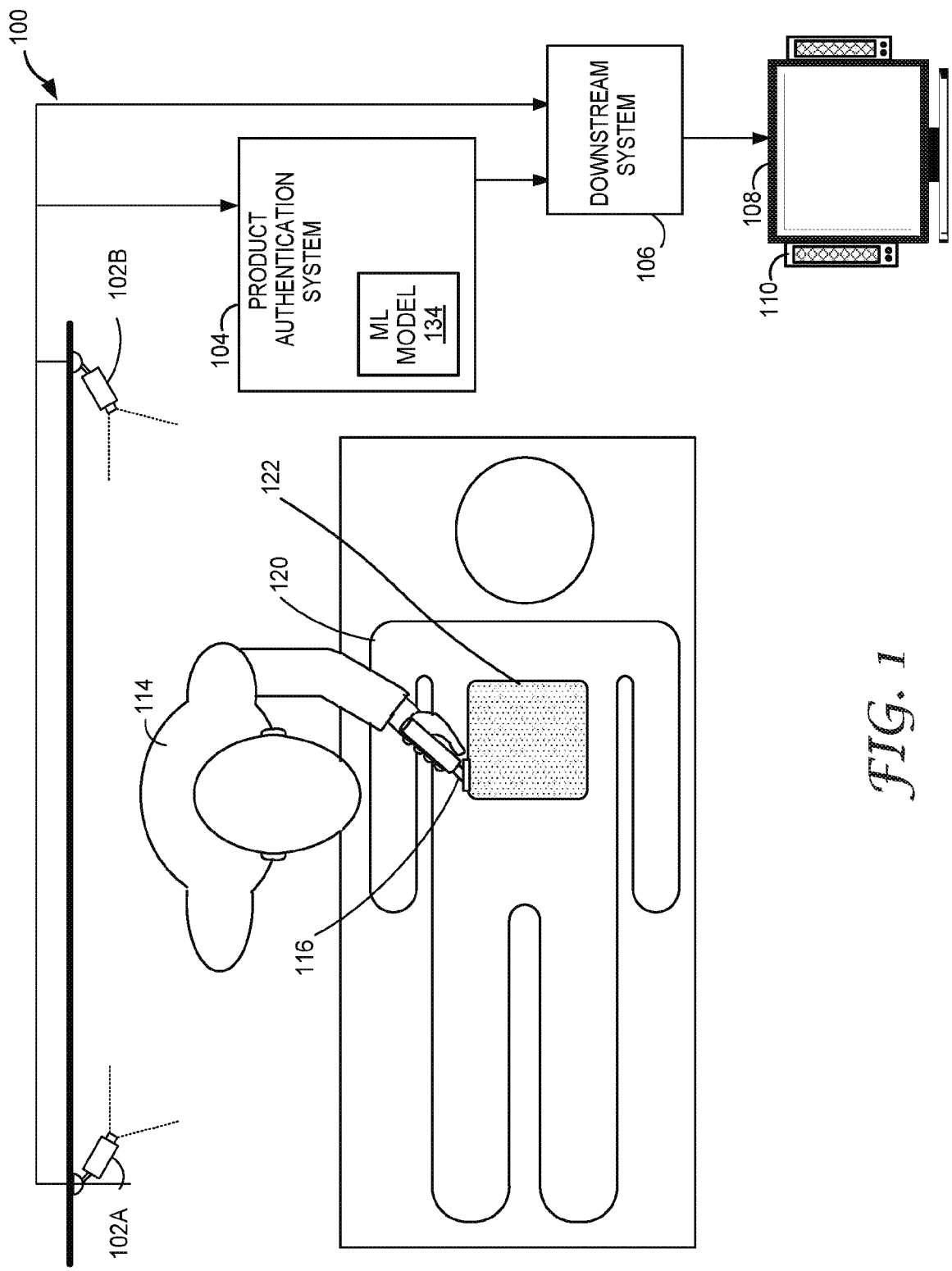
FIG. 1 is a block diagram illustrating an example medical procedure environment including a product authentication system, in accordance with various techniques of this disclosure.

FIG. 1 is a block diagram illustrating an example medical procedure environment 100 including a product authentication system 104, in accordance with various techniques of this disclosure. The medical procedure environment can by any of a number of different types of environments, including hospitals, clinics, day surgery facilities etc. The aspects of the disclosure are not limited to any particular medical procedure environment and are not limited to medical procedure environments. For example, as noted above, the aspects of the disclosure can be applied in any environment where continuous product authentication is desirable such as environments having elevated safety concerns.

The example illustrated in FIG. 1 depicts a patient 120 undergoing a medical procedure performed by a medical professional 114 using a product 116. In the example illustrated in FIG. 1, the product 116 comprises an applicator containing sterilizing liquid that may be applied to patient 120 in preparation for surgery. The medical procedure in this example is the process of applying the product 116 to the patient 120. In the example illustrated in FIG. 1, the product 116 has been applied as indicated by section 122 of the patient 120.

The product 116 can be any type of product used in a medical procedure. Examples of such products include products to be applied to the patient, products to be given to a patient (e.g., medicines), products used by the clinician (hand antiseptic, gloves, personal protective equipment such as gloves masks, gowns, etc., medical instruments used during a medical procedure etc., products used to clean the environment such as the surgical theater between cases, patient rooms, etc. The product also may be a surgical instrument being cleaned, wrapped, and sterilized for use on the next patient.

During the medical procedure, image capture devices 102A and 102B (collectively, "image capture devices 102") capture video data or other image data during the procedure and provide the video data or other image data to product authentication system 104. The image capture devices can be video cameras, infrared cameras, or other types of sensors that can provide a stream of image data to product authentication system 104. In some aspects, streams from multiple image capture devices can be submitted and processed by the product authentication system 104 in parallel with one another.

Product authentication system 104 receives the video data and processes the video data to determine if a designated product (e.g., product 116) is recognized in the video data. A designated product can be a product that the product authentication system has been designed or trained to recognize. The product authentication system 104 can be designed and trained to recognize more than one designated product. As an example, the product authentication system 104 may be designed to recognize one or more designated products. The products can be from the same manufacturer or from different manufacturers. In some aspects, product authentication system 104 processes the video data using a machine learning model 134 to determine if a designated product is recognized in the video data, as will be further described below.

Thus, in the example illustrated in FIG. 1, a product authentication system 104 may receive one or more streams of video data and process the video data using a trained machine learning model 134 to authenticate product 116. The machine learning model 134 may be trained to use a combination of one or more of the appearance of the product 116 container, actions taken in applying the product 116, the appearance of the product in section 122 as applied on the patient 120 and the change in the appearance of the product 116 as applied in section 122 to generate a decision as to whether the product 116 is authentic. As will be appreciated from the foregoing, the use of video data and machine learning model 134 as described herein can provide for continuous authentication of product 116, and can provide increased accuracy in product authentication. The use of spatio-temporal data provided by the video stream thus provides advantages over conventional systems that utilize static 2D images as such systems typically lack the capability to perform the spatio-temporal analysis described herein.

If the product authentication system 104 recognizes a designated product in the video data, the product authentication system 104 can provide an indicator that the designated product was recognized in the video data. The product authentication system 104 continuously processes the video data to continuously determine whether the designated product remains recognized in the video data. In some aspects, the product authentication system 104 can provide the indicator when the designated product was initially recognized in the video data and provide a different indicator when the designated product is no longer recognized in the video data. In other aspects, the product authentication system 104 can continuously provide the indicator for as long as the designated product is recognized in the video data and stop providing the indicator when the designated product is not recognized in the video data.

In some aspects, other attributes of the designated product may be recognized in the video data and provided in addition to the indicator that the designated product was recognized in the video data. For example, the product authentication system 104 may analyze the video data and determine a quantity of the designated product, a dosage of the designated product, an expiration data for the designated product, a serial number of the designated product, or other information associated with the product that can be determined or inferred from the video data. In the example illustrated in FIG. 1, performing these additional tasks may provide an additional output stream linked with a specific objective function. For example, to locate a serial number attribute, the output may be an 8-dimensional vector representing a bounding box that contains the serial number. In this case four pairs of coordinate values can be represented by these 1×8 Dimensional vectors. The content of the bounding box can then be provided to a neural network trained to output the serial number. In some aspects, the neural network trained to recognize these other attributes may be separate from the machine learning model 134 and may be connected in serial with the machine learning model 134.

The indicator (and associated data, if any) can be provided to a downstream system 106 for use in performing further operations with respect to the designated product. For example, the downstream system 106 may be a logging system that can log when the designated product is used in the medical procedure facility. As another example, the downstream system may be an instructional system that can provide instructional content regarding the use of the designated product in response to the presence of the designated product in the video data. As a further example, the downstream system may be a product usage verification system that performs analysis of the video data to determine if the designated product is being used correctly. Instructional content, advisory content or other types of content can be displayed on a monitor 108 and played via speakers 110 by the downstream system 106 while the designated product is recognized as present in the video data. The downstream system 106 can perform various functions. For example, the downstream system 106 may present a score representing the completeness of the task involving the designated product based on a regression task performed using the machine learning model 134. As another example, the downstream system 106 may highlight areas that need further effort/focus from the medical expert. In some aspects, the downstream system 106 may receive from the product authentication system 104 feature vectors or feature maps produced using machine learning model 134.

Product authentication system 104 and downstream system 106 may be located in the same room as that in which the medical procedure is being performed, in the same facility (e.g., hospital, clinic etc.) in which the medical procedure is being performed, or they may be located remotely from the facility and coupled to the equipment in the facility via a wired or wireless communication system. Further, the product authentication system 104 and the downstream system 106 may be in different locations from one another.

Figure 2A:
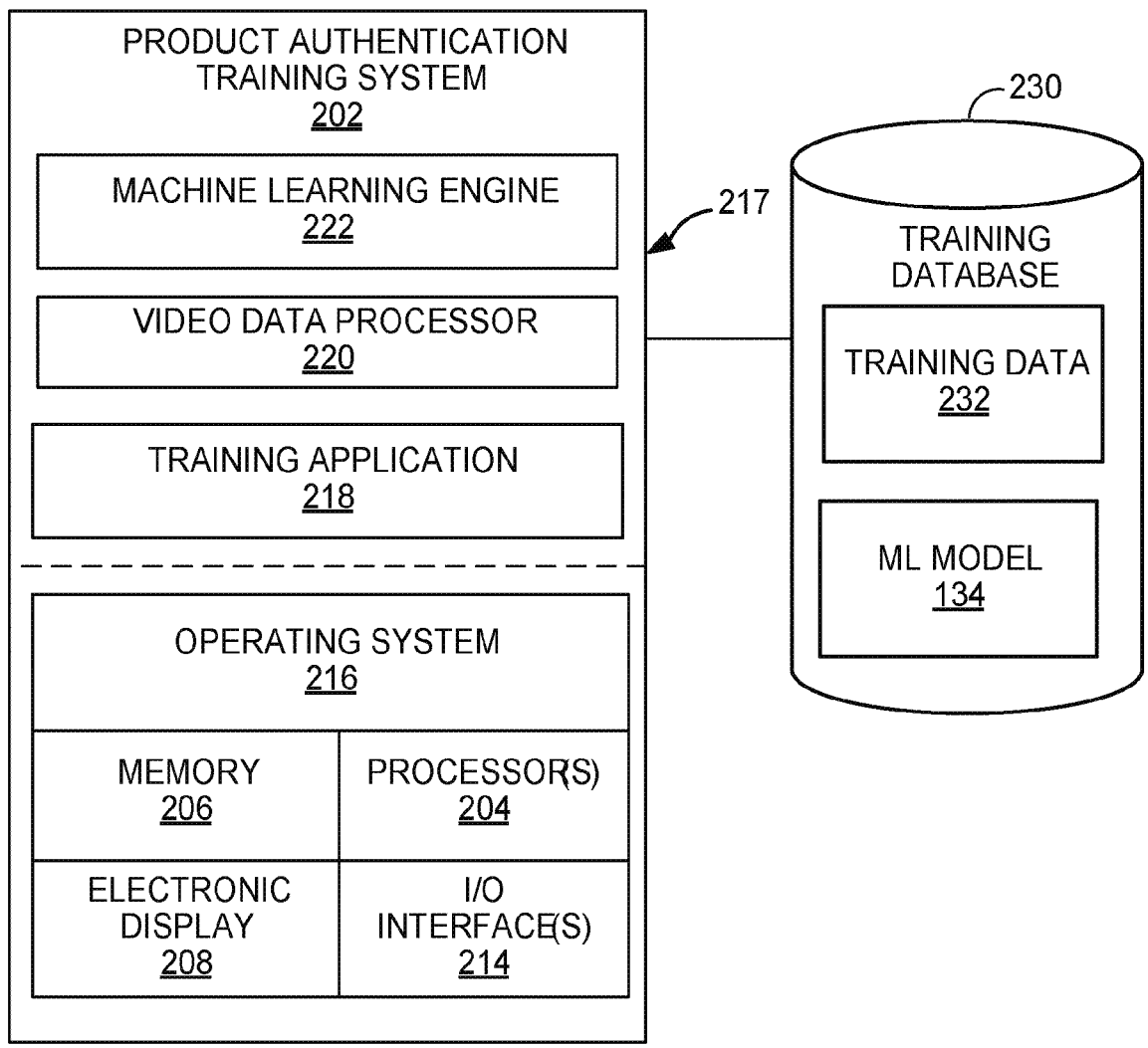
FIG. 2A is an illustration depicting an example product authentication training system that operates in accordance with the techniques of the disclosure.

FIG. 2A is an illustration depicting an example product authentication training system 202 that operates in accordance with the techniques of the disclosure. The product authentication training system 202 can execute a training application 218 that can train a machine learning model 134 to continuously recognize a product while it appears in a video data stream.

In this example, product authentication training system includes one or more processors 204 and memory 206 that, in some examples, provide a computer platform for executing an operating system 216, which may be a real-time multitasking operating system, for instance, or other type of operating system. In turn, operating system 216 provides a multitasking operating environment for executing one or more software components 217. Processors 204 are coupled to one or more I/O interfaces 214, which provide I/O interfaces for communicating with devices such as a keyboard, controllers, display devices, image capture devices, other computing systems, and the like. Moreover, the one or more I/O interfaces 214 may include one or more wired or wireless network interface controllers (NICs) for communicating with a network. Additionally, processors 204 may be coupled to electronic display 208, and image capture devices 138. In some examples, processors 204 and memory 206 may be separate, discrete components. In other examples, memory 206 may be on-chip memory collocated with processors 204 within a single integrated circuit.

Software components 217 of product authentication training system 202 operate to train a machine learning model 134 to recognize the continuing presence of a designated product in video data. In this example, software components 217 include training application 218, video data processor 220 and machine learning engine 222.

In some aspects, a training database 230 include training data 232 that can include numerous video recordings of various aspects of a product. For example, the video recordings may include recordings of containers for the product and associated indicia on the container (logos, quantity, dosage information, expiration data, serial numbers etc.). The video recordings may also include recordings of the usage of the product by a medical professional. Further, the video recordings may include recordings taken after the product has been applied to a patient or otherwise used in a medical procedure. For example, the appearance of the product as initially applied to a patient and changes in the appearance of the product over time can be used to identify or recognize a product in video data. The video recording may also include video recordings in which the product does not appear. The training video recordings can include metadata that labels various aspects of the video recording. For example, the labels may indicate whether the product appears in the video recording. The label can be used by the product authentication training system to determine whether the machine learning model 134 correctly determines whether the designated product is continuously present in the video recording. The video recordings may also include various views of the same product taken from different camera or sensor angles, including simultaneous views from different angels. Further, the video recordings may include recordings of the same product taken different lighting conditions.

The video recordings also may visualize and record information via an infrared (IR) spectrum camera. For example, various labels on a product may incorporate IR readable information. Thus, the product authentication system may include one or more visible spectrum cameras and one or more IR spectrum cameras.

In general, product authentication training application 218 includes functionality to control various aspects of training a machine learning model 134 using the training data 232. For example, training application 218 may provide various user interfaces for selecting various sets of video recordings from the training data 232 and providing various parameters regarding the training (e.g., number of passes, hyperparameters etc.). Further, training application 218 may provide a user interface to specify whether the machine learning engine correctly determined whether or not a designated product is continuously present for at least a portion of the video recording presented to the machine learning engine 222.

Video data processor 220 receives the selected video recordings from the training data 232 and processes the video data in the video recordings as further described below for presentation to the machine learning engine 222. The machine learning engine 222 receives the video data from video data processor and executes machine learning algorithms and heuristics to train the machine learning model 134. In some aspects, the machine learning engine 222 and machine learning model 134 implement a neural network. As examples, the neural network can be a convolutional neural network, a recurrent neural network, a long short-term memory (LSTM) neural network, or other type of artificial intelligence. The machine learning engine 222 can apply the machine learning model 134 to the training video data and make a prediction as to whether the designated product is continuously present for at least a portion of the training video data. If the machine learning model 134 incorrectly determines the presence (as determined using labels in the training data or manual input), "back propagation algorithms" or other optimization techniques can be used to provide adjustments to the machine learning model 134, and the training process can continue.

When the machine learning model 134 is fully trained (i.e., has reached a desired level of accuracy in identifying the continuous presence of a product in video data), the machine learning model 134 can be deployed to a product authentication system 104.

Further details on the operation of video data processor 220 and machine learning engine 222 are provided below with respect to FIGS. 3-7.

Figure 2B:
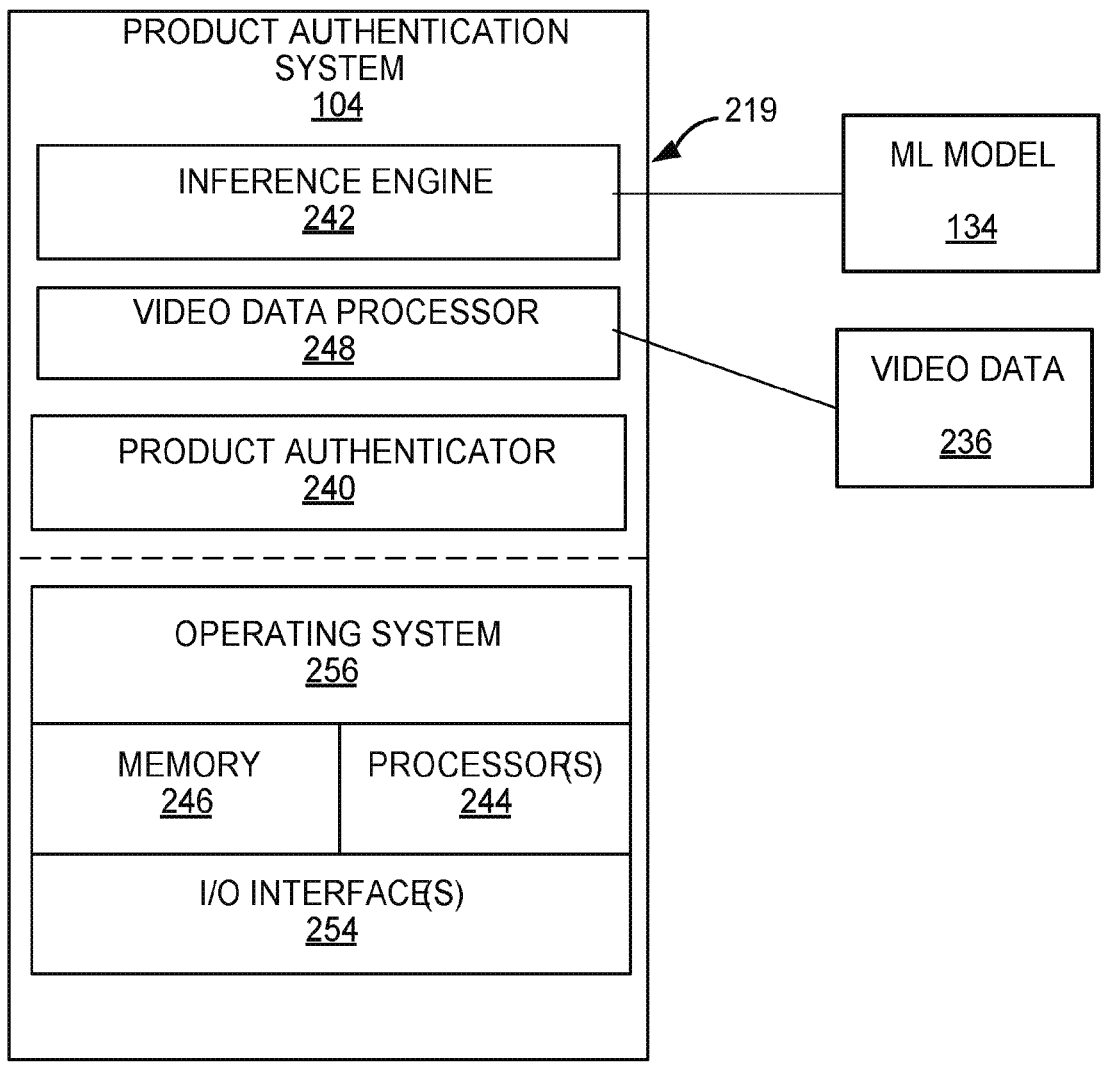
FIG. 2B is an illustration depicting an example product authentication system that operates in accordance with the techniques of the disclosure.

FIG. 2B is an illustration depicting an example product authentication system 104 that operates in accordance with the techniques of the disclosure. In some aspects, product authentication system 104 receives live video data 236 via a video capture device interface 212 and makes real time or near real time determinations, using an inference engine 242 and trained machine learning model 134, whether a designated product is continuously present within portions of the video data 236.

In this example, similar to the product authentication training system of FIG. 2A, product authentication system 104 includes one or more processors 244 and memory 246 that, in some examples, provide a computer platform for executing an operating system 256, which may be a real-time multitasking operating system, for instance, or other type of operating system. In turn, operating system 256 provides a multitasking operating environment for executing one or more software applications 219. Processor(s) 244 may be coupled to one or more I/O interfaces 254, which provide I/O interfaces for communicating with devices such as a keyboard, controllers, display devices, image capture devices, other computing systems, and the like. Moreover, the one or more I/O interfaces 214 may include one or more wired or wireless network interface controllers (NICs) for communicating with a network. In some examples, processors 244 and memory 246 may be separate, discrete components. In other examples, memory 246 may be on-chip memory collocated with processors 244 within a single integrated circuit.

Software applications 219 of product authentication system 104 operate to receive live video data and recognize the continuing presence of a designated product in the live video data. In this example, software applications 219 include product authenticator 240, video data processor 248 and inference engine 242.

In general, product authenticator 240 includes functionality to control various aspects of determining whether or not a designated product is continuously present in live video data 236. For example, product authenticator 240 may provide various user interfaces for selecting parameters regarding product recognition (e.g., products to identify, machine learning models to use, downstream systems to notify etc.).

Similar to product authentication training system 202 discussed above, video data processor 248 receives video data and processes the video data as further described below for presentation to the inference engine 242. However, in this case, video data processor 248 receives live video data 236 provided via a video capture devices 102 during a medical procedure rather than training data.

Inference engine 242 is similar to the machine learning engine 222 of FIG. 2A and receives the video data from video data processor and executes inferencing algorithms and heuristics to determine if and when a designated product is continuously present during a portion of the live video data 236. In some aspects, the inference engine 242 and machine learning model 134 implement the same neural network as used by product authentication training system 202 to train the machine learning model 134. As examples, the neural network can be a convolutional neural network, a recurrent neural network, a long short-term memory (LSTM) neural network, or other type of artificial intelligence. The inference engine 242 can apply the machine learning model 134 to the video data and make a prediction as to whether or not the designated product is continuously present for at least a portion of the live video data 236. Unlike machine learning engine 222, in some aspects, inference engine 242 does not use backpropagation or other techniques to make changes to the machine learning model 134 to improve the accuracy of the model. In other words, inference engine 242 operates similarly to machine learning engine 222 with respect to making predictions regarding the continuous presence of a designated product in a video stream, but in some aspects, does not check the accuracy of the prediction or attempt to correct the machine learning model 134 if the prediction is incorrect. However, in other aspects, the product authenticator may provide an interface to indicate that a prediction was incorrect, and the product authentication system 104 can update the machine learning model 134. In such aspects, the inference engine 242 operates substantially the same as machine learning engine 222. In some aspects, the online update described above can update the machine learning model 134 using machine learning algorithms based on a stochastic gradient descent algorithm.

Further details on the operation of video data processor 248 and inference engine 242 are provided below with respect to FIGS. 3-7.

Figure 3:
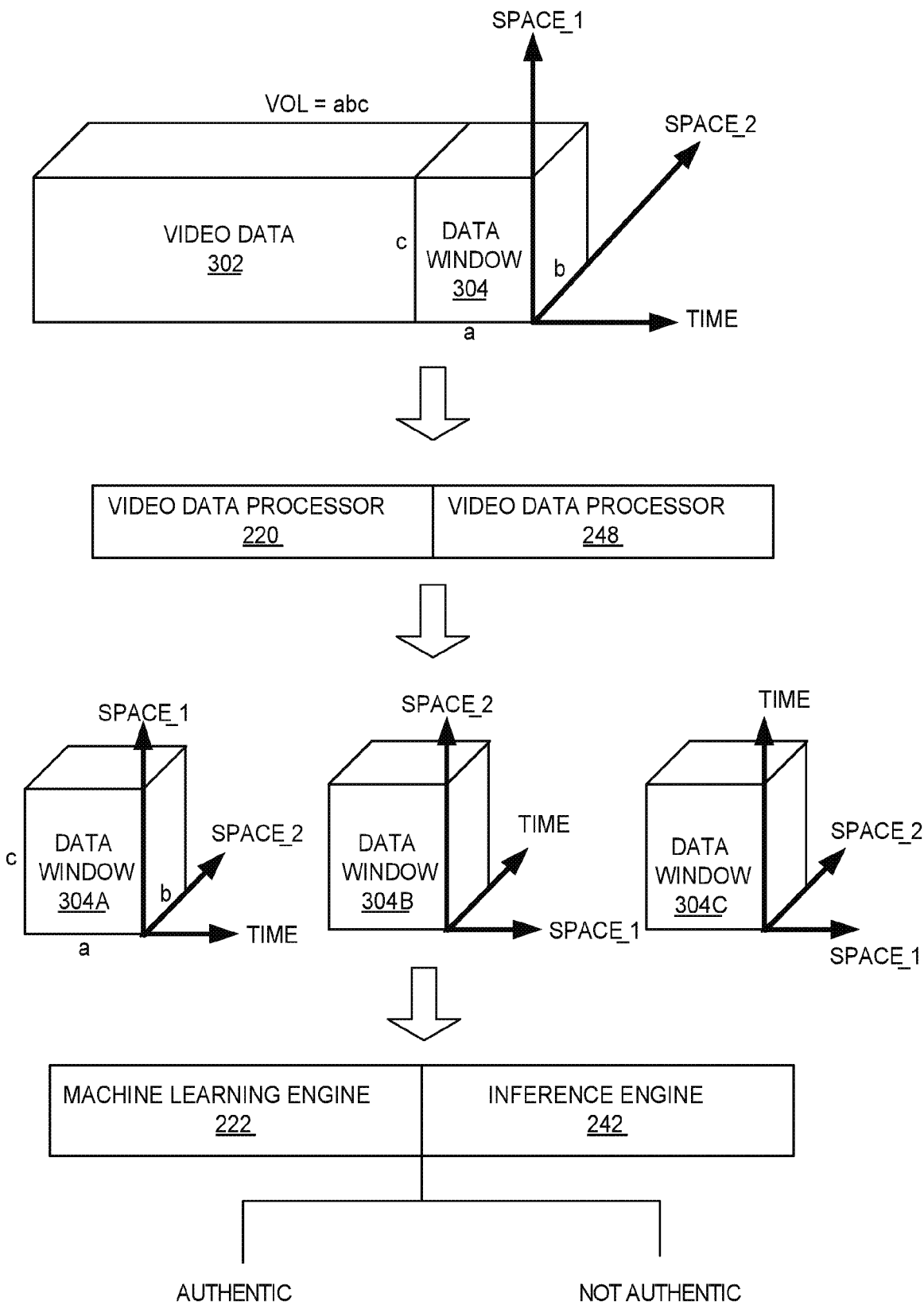
FIG. 3 is a block diagram depicting an example in which video data is processed by an example instance of the product authentication training system and product authentication system of FIGS. 1, 2A and 2B in accordance with the techniques of the disclosure.

FIG. 3 is a block diagram depicting an example in which video data is processed by an example instance of the product authentication training system 202 and product authentication system 104 of FIGS. 1, 2A and 2B in accordance with the techniques of the disclosure. In the example illustrated in FIG. 3, video data 302 can be either training video data from training data 232, or live video data 236. As noted above, in some aspects, the video data 302 comprises a 3D volume having a time axis (labeled "TIME") and two spatial axes (labeled "SPACE_1" and "SPACE_2"). In some aspects, the video data processor 220, 248 divides the video data into data windows, where each data window 304 has a dimension a along the time axis, and dimensions b and c along the spatial axes. Thus, the a dimension represents a time duration of the data window 304, and the b and c dimensions represent the image size. For example, a video data window 304 having a ten frame duration and a 300 pixel by 300 pixel image size can have a×b×c dimensions of 10×300×300. Further, each image can also have channels (e.g. red, green and blue channels for a color image), in this case, the notation can be represented as a×b×c×d where d represents the number of channels. An example using a multi-channel color image is presented below with respect to FIG. 6. However, in order to simplify the explanation, a gray scale image having a single channel will be used below to illustrate aspects of the techniques. Thus, the notation a×b×c can be used because d will have a constant value of one.

The video data processor 220, 248 can also create multiple data windows 304A, 304B and 304C from each data window 304 by rotating or otherwise transforming one or more axes prior to submitting the data window to a machine learning engine 222 or inference engine 242. In the example illustrated in FIG. 3, the video data processor 220, 248 has generated three data streams, each having a different orientation with respect to the time and spatial axes. The three data streams of data windows 304A, 304B and 304C may be submitted to inference engine 242, which uses machine learning model 134 to determine whether a designated product continuously appears in the data window 304. For example, an indicator of "authentic" can be used to indicate that the designated product is authentic and is continuously present in the video data window 304. An indicator of "not authenticated" can be used to indicate that the designated product does not appear in the video data window 304. Although three data streams are illustrated in FIG. 3, the techniques discussed herein can be applied to fewer or more data streams. In some aspects, at least one of the data streams has a temporal dimension. That is, a minimum of one time-space image data stream is received by video data processor 220 in some aspects.

Figure 4:
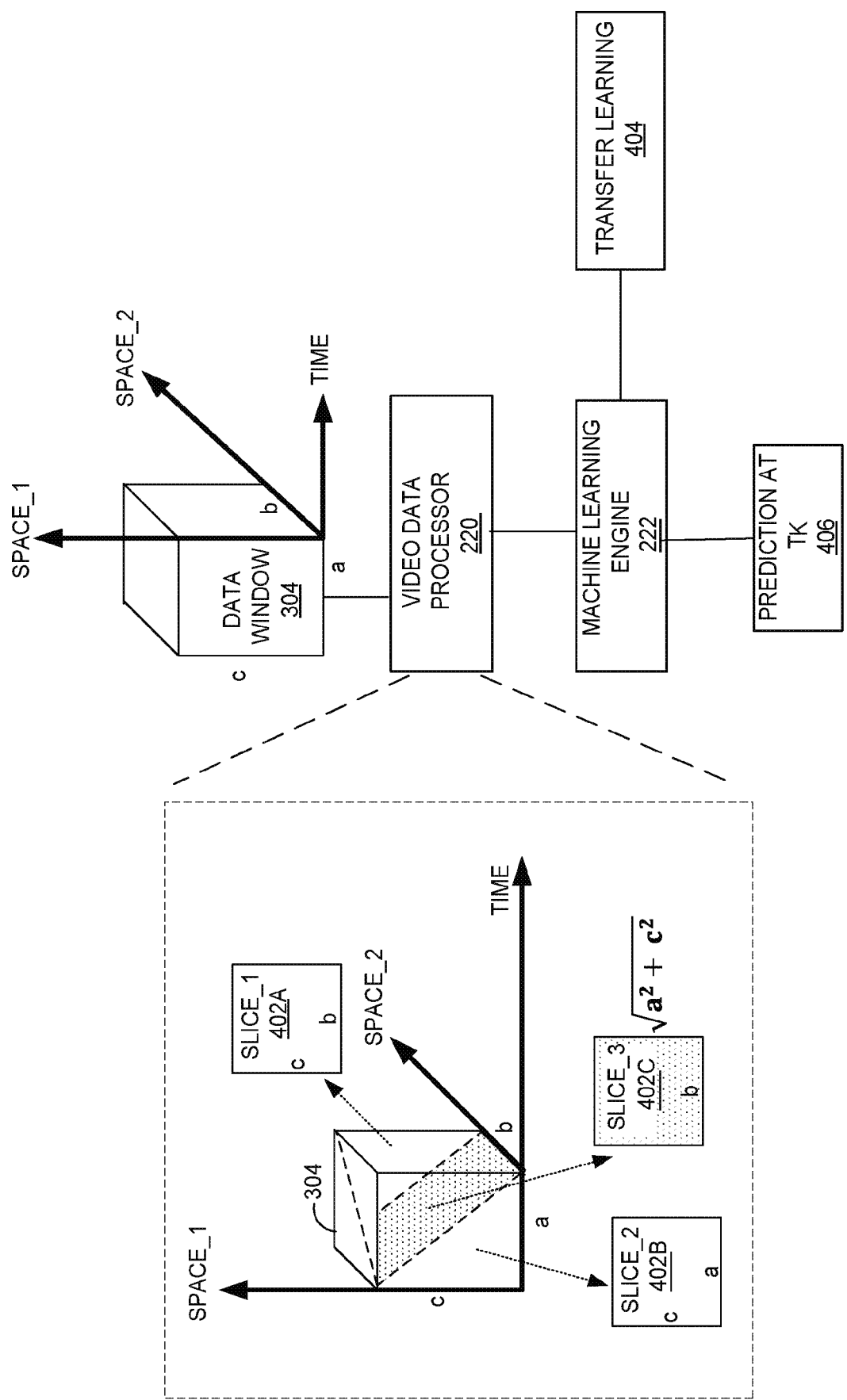
FIG. 4 is a block diagram depicting an example in which video data is separated into two-dimensional slices by an example instance of the product authentication training system and product authentication system of FIGS. 1, 2A and 2B in accordance with the techniques of the disclosure.

FIG. 4 is a block diagram depicting an example in which example instances of the video data processor 220, 248 perform spatiotemporal slicing of the video data into 2D slices in accordance with the techniques of the disclosure. In the example illustrated in FIG. 4, a video data processor 220, 248 creates multiple data streams for submission to machine learning engine 222 and inference engine 242 by taking 2D slices 402 of a video data window 304. The angles formed between the edges of a 2D slice and the time and spatial axes define an orientation of the 2D slice. Thus, two 2D slices that have the same angles between their edges and the time and spatial axes have the same orientation. The data window 304 illustrated in FIG. 4 has a temporal dimension of a and spatial dimensions of b and c. The magnitude of a is determined according to a sliding window size r. Thus, at time $t_k$, $a=t_k-t_r$. The slices 402 can be taken from various orientations with respect to the time axis and the two spatial axes. In the example illustrated in FIG. 4, three slices 402A, 402B and 402C (referred to collectively as slices 402) are illustrated. Slice 1 402A is a slice taken with respect to the first and second spatial axes of the data window. Slice 2 402B is a slice taken with respect to the time axis and first spatial axis. Slice 3 402C is a diagonal slice taken along the second spatial axis and the hypotenuse of the time axis and first spatial axis. As discussed above, in some aspects, at least one image data stream is used to provide a slice that exploits the temporal variations in the data stream. Slice 402B and slice 402C are examples of two such slices in FIG. 4 because they include data that varies along the time axis. These slices capture space-time shapes of the product behaviors which may high prediction value with respect to product identification and authentication. Video data processor 220, 248 can continue to provide further slices along the selected orientations. For example, for slices having an X-Y orientation, the next slice can comprise a next image frame along the time axis. In slices having a time-Y orientation, the next slice can comprise data at the next X position. In some aspects, the video data processor 220, 248 provides slices 402 as multiple data streams, where each data stream includes slices having the same orientation. Thus, in the example illustrated in FIG. 4, video data processor 220, 248 may provide three data streams to machine learning engine 222 or inference engine 242. A first data stream has the slices corresponding to the orientation of slice 402A, a second data stream has the slices corresponding to the orientation of slice 402B, and a third data stream has the slices corresponding to the orientation of slice 402C. Output of the machine learning engine 222 or inference engine 242 comprises a prediction 406 for time t regarding whether a designated product continuously appears in the video data window 304.

Other orientations can be used instead of, or in addition to, the slice orientations illustrated in FIG. 4. Slices taken with respect to these additional orientations can be provided as separate data streams to machine learning engine 222 or inference engine 242. The example illustrated in FIG. 4 includes slices taken according to three orientations. However, the techniques of the disclosure are not limited to any particular number of orientations. In some aspects, a data window 304 may be spatio-temporally sliced according to five or six different orientations. However, for machine learning algorithms one spatio-temporal orientation may be sufficient.

A product authentication training system 202 can include transfer learning 404. As noted above, conventional systems can train a machine learning model 134 to recognize products in 2D images. In some aspects, a product authentication training system 202 can leverage the knowledge encoded in previously trained 2D machine learning models as transfer learning 404. This can be advantageous in reducing the amount of training time required to train a machine learning model 134 to continuously recognize a designated product in a 3D video stream. Typically, in order to successfully utilize transfer learning, the source and target neural networks require at least some compatibility with respect to layer configuration. When dealing with video classification in 3D, neural nets trained on video datasets would appear to be a natural source of transfer learning. However, the number of diverse videos in these 3D datasets is far less than the number of diverse images available in 2D data sets, which makes the benefit of transfer less advantageous if limited to transferring learning from networks trained on 3D video data sets. However, as described herein, 3D space-time is automatically captured in the space-time shapes of 2D image slices (e.g. in spatio-temporal slicing) without requiring an extra dimension on the neural net filters. Because 2D slices are used, transfer learning from neural networks previously trained for product recognition on 2D images can be readily used as transfer learning 404.

Figure 5:
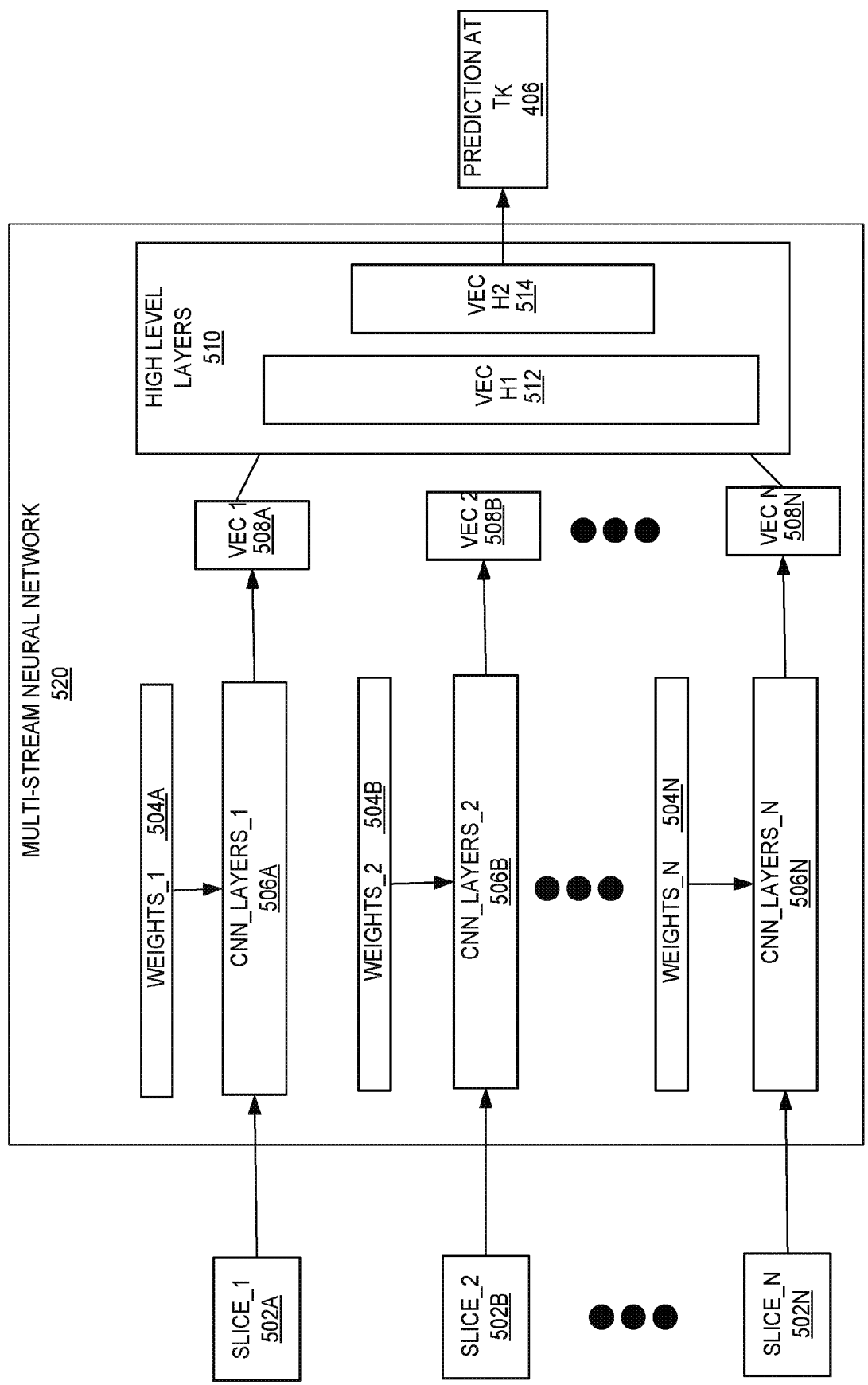
FIG. 5 is a block diagram depicting an example in which data slices are processed by a convolutional neural network and fusion layers of a neural network in an example instance of the product authentication training system and product authentication system of FIGS. 1, 2A and 2B in accordance with the techniques of the disclosure.

FIG. 5 is a block diagram depicting an example multi-stream neural network 520 in which data slices having particular orientations are provided to a corresponding set of convolutional neural network layers 506 by an example instance of the product authentication training system 202 and product authentication system 104 of FIGS. 1, 2A and 2B in accordance with the techniques of the disclosure. In the example illustrated in FIG. 5, slices 502 having various orientations with respect to a time axis and spatial axes are provided as data streams to sets of corresponding convolutional neural network layers 506, where each set of convolutional network layers 506 is trained to process slices each having the same orientation. Thus, each set of layers 506A-506N is an orientation specific set of layers. For example, set of convolutional neural network layers 506A receive a data stream comprising slices of a data window 304 each having the same orientation as slice 1 502A. The set of convolutional neural network layers 506B receive a data stream comprising slices of a data window 304 each having the same orientation as slice 2 502B. This continues, with each set of convolutional neural network layers 506 receiving data streams corresponding to the orientations the network layers were trained for. Thus, for a system in which n slices are taken from a data window 304, convolutional neural network layers 506N receive a data stream comprising slices of a data window 304 each having the same orientation as slice N 502N. Each set of convolutional neural network layers have associated weights 504 that are determined according to the training of the corresponding neural network layers 506.

The output of each set of convolutional neural network layers 506A-506N comprises a vector (i.e., feature map) 508A-508N that summarizes the content of the respective slice 502A-502N. In some aspects, each vector 508A-508N is provided to fully connected high level neural network layers 510 (also referred to as a late fusion layer). In the example illustrated in FIG. 5, the high level neural network layers 510 have two layers producing a vector 512 and vector 514 respectively. The output of the final layer is used to determine prediction 406 at time $t_k$.

During training of the multi-stream neural network 520, the training system can determine if there is an error in the prediction 406 by comparing the prediction 406 to a known value. If there is an error in the prediction 406, high level layers 510 and CNN layers 506 can be jointly optimized in order to improve the prediction capability of the multi-stream neural network 520. For example, the error info can be used in a back-propagation operation applied to the higher level layers 510. Once this first back propagation operation has been completed, an error in each of the vectors 508 can be determined. The error for each of the vectors 508 can then be used in a back propagation operation to adjust the weights 504 for each of the CNN layers 506 that correspond to a particular output vector 508. As a result, each set of orientation specific layers 506 may be updated even though the error was originally determined from the output of high-level layers 510.

The discussion above has been presented in the context of video data received from a single camera or other sensor. In some aspects, video data may be received from multiple image capture devices or other image sensors simultaneously, thus providing multiple concurrent views of a product. In such aspects, slices from simultaneously acquired video data may be provided to orientation appropriate convolutional neural networks at the same time, with the output vectors 508 used to by the high level layers 510 to correlate features of the multiple views in order to identify continuous presence of a designated product. Applying this to the example provided in FIG. 5, assume that there are two image capture devices providing image data simultaneously, and that convolutional neural network layers 506 have been trained using five different slice orientations for the first image capture device and four different slice orientations for the second image capture device. Applying this configuration of two image capture devices to the example multi-stream neural network shown in FIG. 5, N=9, and convolutional neural network layers 1-5 may process video data from the first image capture device, and convolutional neural network layers 6-9 may process simultaneous video data from the second image capture device.

As noted above, recurrent neural networks or LSTM networks may be used in some aspects. The use of recurrent neural networks or LSTM networks may be advantageous because such networks can correlate features from previously processed slices with currently processed slices, thereby adding additional temporal aspects to the machine learning model. This can result in a more accurate machine learning model, at the potential expense of requiring more training time.

Figure 6:
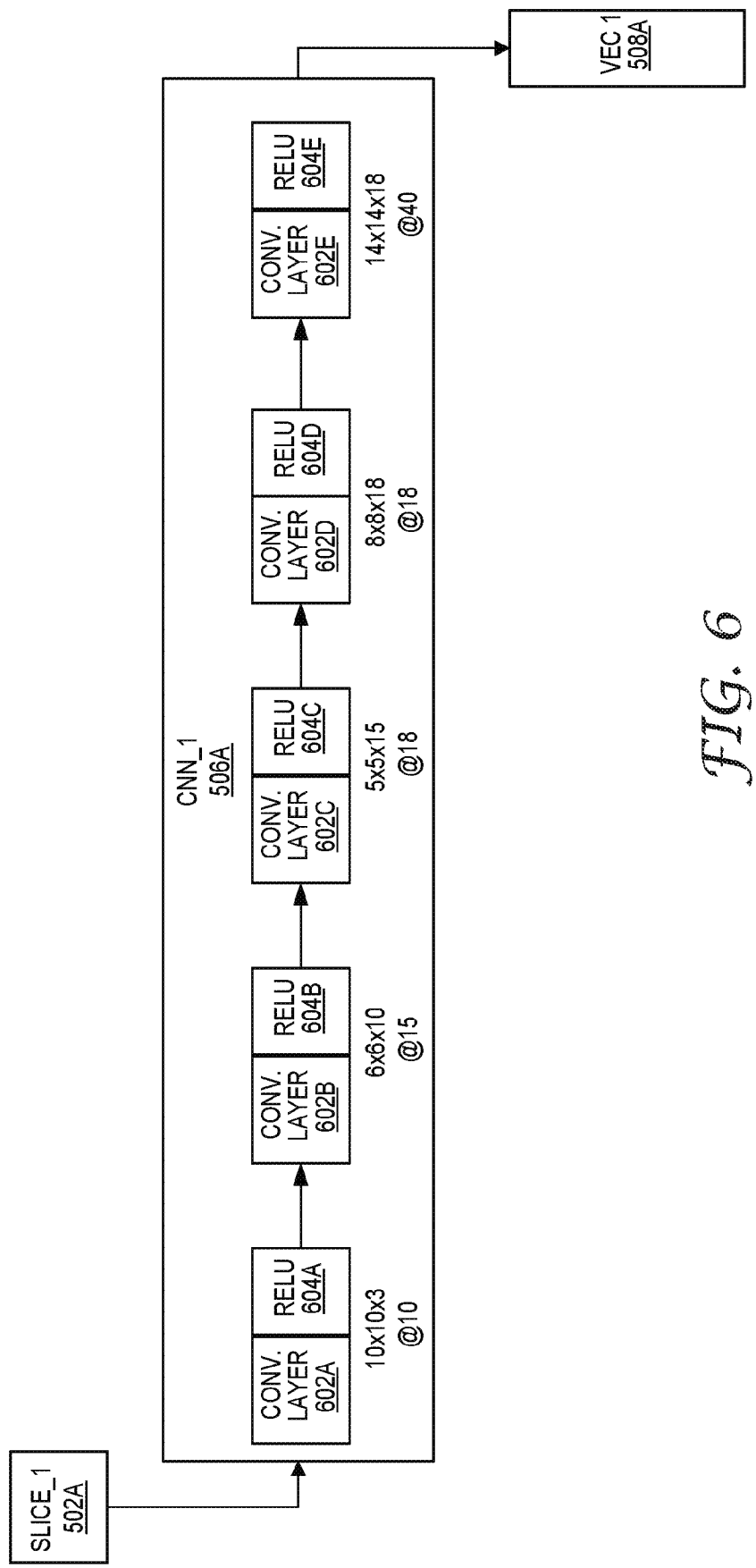
FIG. 6 is a block diagram depicting an example data slice being processed by a convolutional neural network by an example instance of the product authentication training system and product authentication system of FIGS. 1, 2A and 2B in accordance with the techniques of the disclosure.

FIG. 6 is a block diagram depicting an example data slice being processed by a convolutional neural network by an example instance of the product authentication training system and product authentication system of FIGS. 1, 2A and 2B in accordance with the techniques of the disclosure. The example illustrated in FIG. 6 provides further details of the convolutional neural networks layers 506 of FIG. 5, and shows a representative sample set of convolutional neural network layers 506A operating on a data stream of slices 502A where each slice has the same orientation, and the orientation corresponds to the orientation used to train the set of convolutional neural network layers 506A. In the example illustrated in FIG. 6, the set of convolutional neural network layers 506A has a series of convolution layers 602 and rectified linear units 604. In some aspects, the convolution layers 602 provide a two dimensional neuron, and the rectified linear units 604 are activation functions for the neurons that are designed to produce non-linear output.

For the purposes of the example illustrated in FIG. 6, assume that the video data comprises 300×300 pixels (i.e., b=c=300), and a window stride of two is used for all layers. Thus, in this example, an input slice 502A has a size of 300×300×3, which is the size of the image in pixels and three red, green, blue (RGB) values per pixel represent the three channels. The first convolution layer 602A has a filter size of 10 pixels×10 pixels×3 RGB values. There are ten filters in convolution layer 602A as indicated by the "@10" notation, thus the layer produces 10 output feature maps. The next convolution layer 602B has a filter size of 6×6×10, and includes 15 filters as indicated by the "@15" notation. The following convolution layer 502C has a filter size of 5×5×15 and includes 18 filters. The penultimate convolution layer 602D has an 8×8×18 filter size and also includes 18 filters. The final convolution layer 502E has a 14×14×18 filter size and includes 40 filters. Thus, the final output of the set of convolutional neural network layers 506A comprises a vector 508A that effectively summarizes the content of slice 1 502A. As shown in FIG. 5, the vector 508A is combined with the output vectors 508B-508N and processed by high level neural network layers 510. Thus, the set of convolutional neural network layers 506A can receive a slice 502A and produce a vector output 508A having a dimension of 1×40. This vector output 508A can be fed to high-level neural network layers 510 that can jointly learn the correlations seen in the spatiotemporal signatures represented in vectors 508 from different slices 502.

Figure 7:
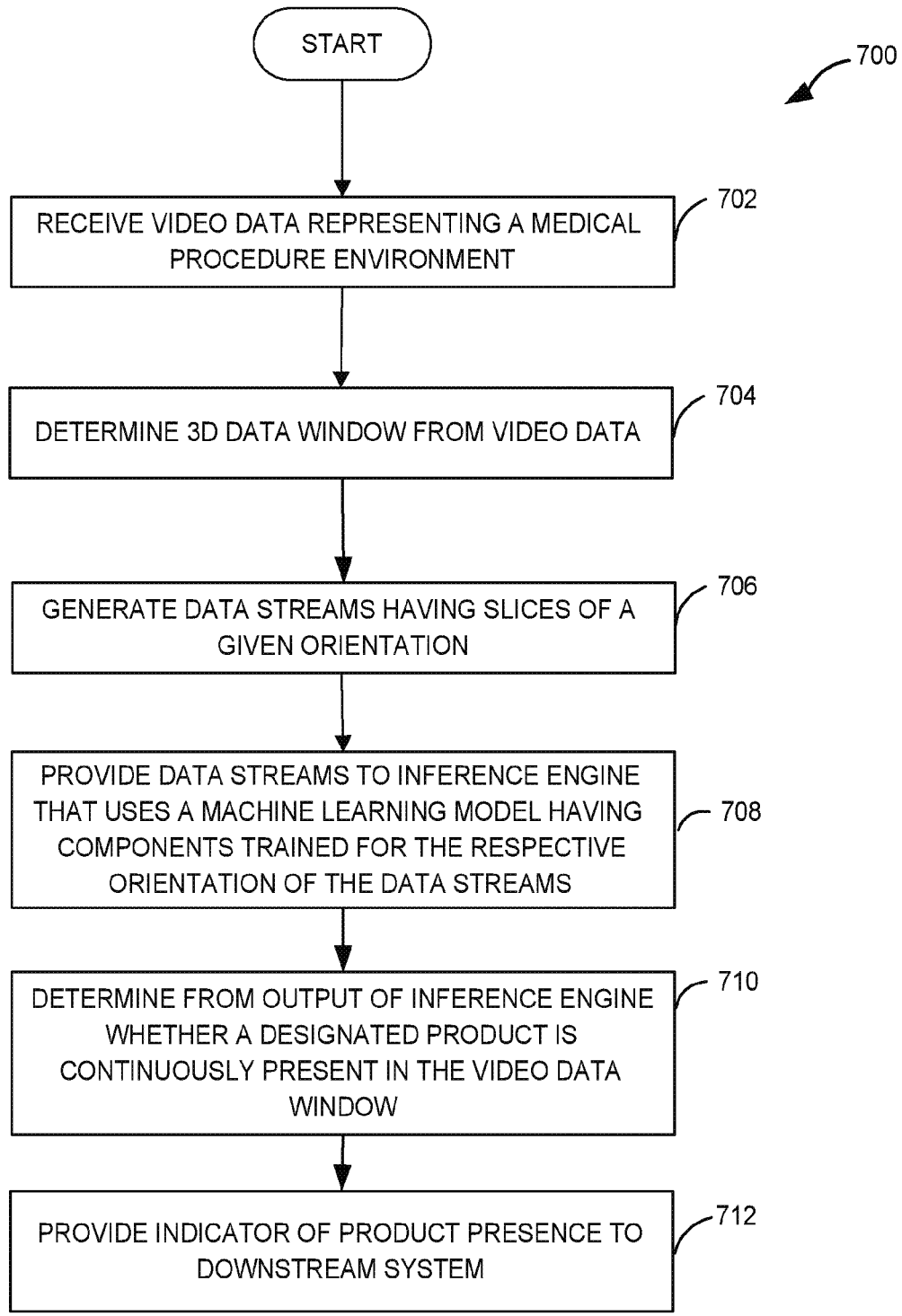
FIG. 7 is a flowchart illustrating example operations of a method for continuous product authentication in accordance with aspects of the disclosure.

FIG. 7 is a flowchart illustrating example operations of a method for continuous product authentication in accordance with aspects of the disclosure. The example operations illustrated in flowchart 700 may be performed continuously during the performance of a medical procedure or during the use of a product in a medical environment. A product authentication system or training system receives video representing a medical procedure environment such as a hospital operating room, clinic, day surgery facility etc. (702).

In the case of a product authentication training system, the video may be prerecorded video clips of previously performed medical procedures or usages of a designated product. The prerecorded video clips may include metadata labeling the products and attributes of products appearing in the video to assist in automated training of the machine learning model.

In the case of a product authentication system, the video can be live video of the actual performance of a medical procedure or usage of a product in a medical environment.

A video data processor treats the input video as a three-dimensional volume having a time axis and two spatial axes (e.g., an X and Y axis). The video data processor divides the input video into three-dimensional data windows (704). In some aspects, the three-dimensional windows have a duration of τ. The value of τ may vary depending on the response time requirements at hand, the computational resources that are available, and the frame-rate at which the videos frames are captured. Processing larger volumes may provide a larger context and more information but may also consume more resources (e.g. memory, GPUs, etc.) and may use larger neural network models to provide a response. Depending on these factors, the value of T may range from a fraction of a second to several seconds. For a general medical application with frame rate of 25 fps, with resolutions of about 300×300×3, 400×400×3 or 500×500×3, the value of T may range from 1-12 seconds.

The video data processor generates multiple data streams from the same three-dimensional window by spatiotemporally slicing the three-dimensional window in different orientations (706). For example, the video data processor may create a first data stream having slices corresponding to the X and Y axes of the three-dimensional window, a second data steam having slices corresponding to the time axis and the Y axis of the three-dimensional window, and a third data stream having slices corresponding to the X axis and a hypotenuse determined according to the Y axis and the time axis. Other orientations may be used in addition to, or instead of any of the three aforementioned orientations.

The video data processor then provides the individual data streams to an inference engine (708). As described above, the inference engine can include both individual CNN layers 506 and joint high level layers 510, where the individual CNN layers 506 are specific to a particular slice orientation and the joint high level layers 510 relate the output of the individual CNN layers 506. For example, the inference engine may include multiple sets of convolutional neural network layers 506, where each set of layers 506 are trained on slices having a different orientation. The inference engine can supply the respective input data streams to the corresponding convolutional neural network layers that were trained with training data slices having the same orientation as the respective input data stream.

The output of the inference engine can be used to determine if the designated product is continuously present in the video data window (710). In some aspects, the output vectors of each orientation specific convolutional neural network are provided to a high level convolutional neural network (late fusion layer). The high level convolutional neural network can use correlations seen in the spatiotemporal signatures represented by the output vectors corresponding to different slices to make a prediction of whether or not a designated product is continuously present in the data window.

An indicator of whether the designated product is continuously present can be provided to a downstream system. The downstream system can use the indicator to log usage of the designated product, determine if the product is being correctly used, or determine instructional content to be provide regarding the designated product.

The above discussion has been presented in the context of medical environments where medical procedures may be performed, or where medical related products may be used. The above-described techniques can be applied to other environments as well. For example, the techniques can be applied to video regarding the use of safety equipment to determine the presence of designated product components of the safety equipment.

In the present detailed description of the preferred embodiments, reference is made to the accompanying drawings, which illustrate specific embodiments in which the invention may be practiced. The illustrated embodiments are not intended to be exhaustive of all embodiments according to the invention. It is to be understood that other embodiments may be utilized, and structural or logical changes may be made without departing from the scope of the present invention. The following detailed description, therefore, is not to be taken in a limiting sense, and the scope of the present invention is defined by the appended claims.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

It is to be recognized that depending on the example, certain acts or events of any of the methods described herein can be performed in a different sequence, may be added, merged, or left out altogether (e.g., not all described acts or events are necessary for the practice of the method). Moreover, in certain examples, acts or events may be performed concurrently, e.g., through multi-threaded processing, interrupt processing, or multiple processors, rather than sequentially.

The techniques described in this disclosure may be implemented, at least in part, in hardware, software, firmware or any combination thereof. For example, various aspects of the described techniques may be implemented within one or more processors, including one or more microprocessors, DSPs, application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

What is claimed is:

1. A system comprising:
   at least one image capture device configured to capture video data representative of an enhanced safety environment;
   a machine learning model trained to recognize a designated product; and
   at least one computing device comprising a memory and one or more processors coupled to the memory, wherein the memory comprises instructions that cause the one or more processors to continuously perform operations comprising operations to:
      determine, from the video data, a three-dimensional data window having a first spatial axis, a second spatial axis and a time axis;
      generate, from the three-dimensional data window, a plurality of data streams including data varying along the time axis of the three-dimensional data window, each respective data stream of the plurality of data streams having a plurality of slices of the three-dimensional data window, each respective data stream of the plurality of data streams having a different orientation with respect to the first spatial axis, the second spatial axis, and the time axis from the orientation of each plurality of slices in each other data stream of the plurality of data streams;
      determine, based at least in part on the at least one data stream and the machine learning model, a continuous presence of the designated product in the enhanced safety environment, the machine learning model comprising a plurality of sets of orientation-specific convolutional layers trained according to the orientations associated with the plurality of data streams;
      provide each of the plurality of data streams to the set of orientation specific convolutional layers associated with the corresponding orientation of the plurality of slices in the data stream; and
      provide an indicator of the continuous presence of the designated product to a downstream system.

2. The system of claim 1, wherein the operations to determine the continuous presence of the designated product in the enhanced safety environment further comprise operations to provide output of each of the sets of orientation specific convolutional layers to one or more high level neural network layers.

3. The system of claim 1, wherein the machine learning model comprises a plurality of sets of orientation specific neural network layers, each of the sets of orientation specific neural network layers are connected to at least one high level neural network layer, wherein at least one of the sets of orientation specific neural network layers is trained with data varying along the time axis.

4. The system of claim 3, wherein the at least one high level neural network layer comprises a plurality of fully connected neural network layers.

5. The system of claim 1, wherein the at least one data stream including data along the time axis comprises a plurality of slices having an orientation along the first spatial axis and a diagonal formed by the hypotenuse of the second spatial axis and the time axis.

6. The system of claim 1, wherein the machine learning model comprises a plurality of orientation specific convolutional layers trained to determine the presence of the designated product based, at least in part, on image data representing the appearance of the designated product as applied on a patient.

7. The system of claim 1, wherein the machine learning model is trained to determine the presence of the designated product based, at least in part, on image data representing changes in appearance of the designated product after application on a patient.

8. The system of claim 1, wherein the at least one machine learning model is trained to determine the presence of the designated product based, at least in part, on image data representing an appearance of a container of the designated product.

9. The system of claim 1, wherein the enhanced safety environment comprises a medical procedure environment.

10. A method comprising:
    capturing, via at least one video capture device, video data representative of an enhanced safety environment;
    continuously performing, during at least a portion of one or more actions taken with respect to the enhanced safety environment, operations comprising:
       determining, from the video data, a three-dimensional data window having a first spatial axis, a second spatial axis and a time axis,
       generating, from the three-dimensional data window, a plurality of data streams including data varying along the time axis of the three-dimensional data window, each respective data stream of the plurality of data streams having a plurality of slices of the three-dimensional data window, each respective data stream of the plurality of data streams having a different orientation with respect to the first spatial axis, the second spatial axis, and the time axis from the orientation of each plurality of slices in each other data stream of the plurality of data streams;
       determining, based at least in part on the at least one data stream and a machine learning model trained to recognize a designated product and comprising a plurality of sets of orientation-specific convolutional layers trained according to the orientations associated with the plurality of data streams, continuous presence of the designated product in the enhanced safety environment; provide each of the plurality of data streams to the set of orientation specific convolutional layers associated with the corresponding orientation of the plurality of slices in the data stream; and
       providing an indicator of the continuous presence of the designated product to a downstream system.

11. The method of claim 10, wherein determining the continuous presence of the designated product in the enhanced safety environment further comprises providing output of each of the sets of orientation specific convolutional layers to one or more high level neural network layers.

12. The method of claim 10, wherein generating the at least one data stream comprises generating slices having an orientation along the time axis and one of the first spatial axis and the second spatial axis.

13. The method of claim 10, wherein generating the at least one data stream comprises generating slices an orientation along the first spatial axis and a diagonal formed by the hypotenuse of the second spatial axis and the time axis.

14. The method of claim 10, further comprising training the machine learning model to determine the continuous presence of the designated product based, at least in part, on image data representing an appearance of the designated product as applied on a patient.

15. The method of claim 10, further comprising training the machine learning model to determine the continuous presence of the designated product based, at least in part, on image data representing an appearance of a container of the designated product.

16. A non-transitory computer-readable medium comprising instructions that, when executed, cause one or more processors of a product authentication system to continuously perform, during at least a portion of one or more tasks in an enhanced safety environment, operations comprising operations to:
- receive video data representative of the enhanced safety environment;
- determine, from the video data, a three-dimensional data window having a first spatial axis, a second spatial axis and a time axis;
- generate, from the three-dimensional data window, a plurality of data streams including data varying along the time axis of the three-dimensional data window, each respective data stream of the plurality of data streams having a plurality of slices of the three-dimensional data window, each respective data stream of the plurality of data streams having a different orientation with respect to the first spatial axis, the second spatial axis, and the time axis from the orientation of each plurality of slices in each other data stream of the plurality of data streams;
- determine, based at least in part on the plurality of data streams and a machine learning model, continuous presence of a designated product in an enhanced safety environment, the machine learning model comprising a plurality of sets of orientation-specific convolutional layers trained according to the orientations associated with the plurality of data streams;
- provide each of the plurality of data streams to the set of orientation specific convolutional layers associated with the corresponding orientation of the plurality of slices in the data stream; and
- provide an indicator of the continuous presence of the designated product to a downstream system.

17. The non-transitory computer-readable medium of claim 16, wherein the operations to determine the continuous presence of the designated product in the enhanced safety environment further comprise operations to provide output of each of the sets of orientation specific convolutional layers to one or more high level neural network layers.

18. The non-transitory computer-readable medium of claim 16, wherein the machine learning model comprises a plurality of sets of orientation specific neural network layers, each of the sets of orientation specific neural network layers are connected to at least one high level neural network layer, wherein at least one of the sets of orientation specific neural network layers is trained with data varying along the time axis.

19. The non-transitory computer-readable medium of claim 18, wherein the at least one high level neural network layer comprises a plurality of fully connected neural network layers.

20. The non-transitory computer-readable medium of claim 16, wherein the at least one data stream including data along the time axis comprises a plurality of slices having an orientation along the first spatial axis and a diagonal formed by the hypotenuse of the second spatial axis and the time axis.

* * * * *

UNITED STATES PATENT AND TRADEMARK OFFICE
CERTIFICATE OF CORRECTION

PATENT NO. : 12,026,965 B2
APPLICATION NO. : 17/650019
DATED : July 2, 2024
INVENTOR(S) : Muhammad Jamal Afridi Page 1 of 1

It is certified that error appears in the above-identified patent and that said Letters Patent is hereby corrected as shown below:

In the Claims

<u>Column 19</u>
Line 8-9, In Claim 13, delete "slices an orientation" and insert -- slices having an orientation --, therefor.

Signed and Sealed this
Eleventh Day of February, 2025

Coke Morgan Stewart
*Acting Director of the United States Patent and Trademark Office*